US006152282A

United States Patent [19]

Ewan et al.

[11] Patent Number: 6,152,282

[45] Date of Patent: Nov. 28, 2000

[54] LANED CONVEYOR BELT

[75] Inventors: James Ewan, Los Altos, Calif.; Philip L. Hoffman, Medford, Oreg.

[73] Assignee: SRC Vision, Inc., Medford, Oreg.

[21] Appl. No.: 09/241,826

[22] Filed: Feb. 1, 1999

[51] Int. Cl.[7] .............................. B65G 47/24; B07C 5/02; B07C 5/342

[52] U.S. Cl. .......................... 198/382; 198/399; 198/415; 209/539; 209/541; 209/580; 209/701

[58] Field of Search .................................... 209/539, 540, 209/580, 576, 521, 541, 545, 701; 198/415, 399, 382, 817, 833

[56] References Cited

U.S. PATENT DOCUMENTS

| | | | |
|---|---|---|---|
| 1,422,002 | 7/1922 | Shaw . | |
| 2,456,031 | 12/1948 | Spain | 198/30 |
| 2,637,433 | 5/1953 | Shuttleworth | 198/415 |
| 2,704,146 | 3/1955 | Reck | 198/399 |
| 3,068,989 | 12/1962 | Packman et al. | 198/382 |
| 3,653,509 | 4/1972 | Goodman, Jr. et al. | 209/102 |
| 4,042,100 | 8/1977 | Morrone | 198/446 |
| 4,376,481 | 3/1983 | Franklin | 198/382 |
| 4,485,912 | 12/1984 | Carmichael et al. | 198/382 |
| 4,880,104 | 11/1989 | Evans et al. | 198/445 |
| 4,898,270 | 2/1990 | Hopkins et al. | 198/396 |
| 4,925,002 | 5/1990 | Williams | 198/445 |
| 4,932,514 | 6/1990 | Doppenberg | 198/445 |
| 5,069,019 | 12/1991 | Lodewegen | 53/443 |
| 5,085,325 | 2/1992 | Jones et al. | 209/580 |
| 5,123,516 | 6/1992 | Moore | 198/396 |
| 5,355,992 | 10/1994 | Baig et al. | 198/495 |
| 5,431,289 | 7/1995 | Hoffman | 209/638 |
| 5,515,668 | 5/1996 | Hunt et al. | 53/543 |
| 5,542,525 | 8/1996 | Kornely | 198/495 |
| 5,598,915 | 2/1997 | Malmberg et al. | 198/495 |
| 5,871,080 | 2/1999 | Manzi et al. | 198/382 |

OTHER PUBLICATIONS

Eagle Belting Co., Eagle Urethane Belting (before Feb. 1998), pp. 2–11.

*Primary Examiner*—Donald P. Walsh
*Assistant Examiner*—Daniel K Schlak
*Attorney, Agent, or Firm*—Stoel Rives LLP

[57] ABSTRACT

A laned conveyor apparatus includes an infeed roller and an outfeed roller rotatably mounted to a frame in spaced apart relation for movably supporting a flexible product-carrying belt that forms a closed loop about the rollers to define a conveying region having a length and a width. A plurality of elastic separating bands are removably positioned around the rollers and the product-carrying belt and spaced apart at intervals along the width of the conveying region to form lanes along the length of the conveying region. The separating bands contact an outer surface of the product-carrying belt to form a frictional interface with the product-carrying belt that causes the separating bands to move in coordination with movement of the product-carrying belt. A guide mechanism mounted to the frame includes multiple guide features spaced apart at intervals along the width of the conveying region for guiding the separating bands so that the lanes are accurately and precisely positioned in relation to the frame. An adjustable tensioning device is provided for tensioning the separating bands across the conveying region to minimize slippage of the separating bands at the frictional interface. An infeed device is positioned to feed multiple streams of articles into the lanes. The frame is suitable for mounting an inspection and sorting system near the outfeed end of the conveyor apparatus for inspection and sorting of the articles as they are projected from the outfeed end of the conveyor apparatus. The rollers define effective pitch diameters of the product-carrying belt and the separating bands. The ratio of the effective pitch diameter of the separating bands to the effective pitch diameter of the product-carrying belt results in movement of the separating bands at a faster linear rate than the product-carrying belt, thereby causing an article that is inadvertently placed partly upon one of the separating bands and partly contacting the product-carrying belt to be urged or turned onto the product-carrying belt as the article is carried along the conveying region. Methods of segregating streams of articles are also disclosed.

20 Claims, 12 Drawing Sheets

50 66 80 $V_b$ 226 228 120 $\frac{d_{b-i}}{2}$ 54 60 $V_p$ $\frac{d_{b-o}}{2}$ 56 92 $\omega_i$ $\frac{d_{p-o}}{2}$ $\omega_o$ $\frac{d_{p-i}}{2}$ 222 230 232 220 86

90
136
170
130
126
140
152
160
180
144
176
156
132
128
158
148
100

LANED CONVEYOR BELT

TECHNICAL FIELD

The present invention relates generally to automated bulk processing equipment for inspecting and sorting articles and, in particular, to conveyor systems for transporting articles sorted by such equipment.

BACKGROUND OF THE INVENTION

Automated bulk processing equipment rapidly inspects and sorts bulk articles including raw or processed fruit, vegetables, wood chips, recycled plastics and other similar products. Typically, articles are transported along a conveyor and inspected optically by means of a detection device such as a photoelectric detector. The articles can be characterized optically and sorted according to size, color, shape or other qualities. For example, stems and debris can be separated from fruit, fruit and vegetables can be reliably graded and sorted, undercooked potato chips can be distinguished and separated from fully cooked potato chips, and discolored or otherwise defective articles can be separated from acceptable articles. Elongated articles, such as carrots, french fries, and green beans, can be inspected for uniformity of size, shape, and for defects, and sorted accordingly. Modern bulk optical processing equipment can rapidly separate very large quantities of articles into many categories.

Such equipment typically includes a conveyor system that moves articles in a single layer past an inspection station where cameras or other detection devices examine the articles. The inspection station sends signals to a sorting or treatment station where the articles are sorted or otherwise treated according to information received from the inspection station. For example, foreign or defective articles may be removed from the flow of articles carried by the conveyor system. Typically, unacceptable articles are removed by directing an accurately timed blast of fluid, such as compressed air, at the article as it is projected from the conveyor belt to direct the article out of the process flow. Separation takes place at a location beyond the conveyor system where the articles are unsupported so that defective articles can easily be removed from the process flow. Acceptable articles are received in an outfeed receiving location, while unacceptable articles are directed into a reject receiving location.

Conveyor systems used for rapid inspection and sorting of large quantities of articles typically comprise a single continuous or endless conveyor belt that carries articles at speeds ranging from approximately 200 ft/min to approximately 1,100 ft/min (61 to 335 m/min). One type of conventional automated bulk processing system including a conventional conveyor and off-belt inspection system is illustrated in FIG. 1. An article infeed device 10 delivers articles to a conveyor belt 12 that moves in a direction 14 at a velocity great enough to project articles from conveyor belt 12 in a trajectory 16 toward an outfeed receiving location 18. The articles pass through an off-belt optical inspection station 20 comprising light modules 22 and 22' operably connected to a camera module 24. Unacceptable articles are removed from the flow of articles along trajectory 16 at an unacceptable article removal station by means of a fluid blast emanating from a fluid ejection manifold 26 that diverts the article in a direction 28 out of trajectory 16 and into a reject receiving location 30.

When inspecting articles off-belt for uniformity of length, width, girth, and shape, and for defects, it is important that the articles are projected from the conveyor in a single layer aligned in a particular orientation. For elongated articles, this orientation is preferably parallel to the direction of movement of the conveyor. A problem with conventional flat conveyor belt systems driven at high speeds is that the articles are delivered to the conveyor belt in random orientations and are not aligned before being projected from the conveyor. In addition, many articles are relatively unstable on the conveyor belt and tend to move laterally across the belt in addition to rolling, tumbling, bouncing and colliding with each other, resulting in misalignment of the articles as they traverse the inspection station. This misalignment makes it difficult to accurately and reliably determine the length of articles and distinguish defective articles. Singulation of the articles, i.e., separation between adjacent articles, is also important for accurate and reliable inspection. Misalignment or poor singulation of the articles also results in incorrect sorting of articles at the sorting station.

One known way to overcome these material stability problems is to provide lanes within which the articles travel as they move along in the conveyor system. An infeed device, such as a chute, a vibratory feed device, or a shaker, orients and feeds the articles into the lanes. By feeding the articles into each of the lanes in a single file manner and at intervals, the position, orientation, and singulation of the articles is maintained as the articles travel along the conveyor system.

Conventional laned sorter systems are of two types. The first is of a type comprising a wide flat belt and stationary divider walls suspended from a frame of the conveyor system and positioned above a conveying region of the flat belt to guide articles placed thereon. U.S. Pat. No. 5,515,668 describes such a system that includes adjustable dividers. This configuration is not suitable for raw food processing applications because the dividers interfere with article inspection and sorting systems, impede the flow of articles, and tend to accumulate unsanitary debris.

A second type of conventional laned sorter system includes a sorter belt having divider ribs integrally formed in or bonded to the outer surface of a flat belt. As the belt travels around the rollers at each end of the conveyor, the ribs are subjected to shear, compressive, and tensile stresses that lead to structural failure of the ribs or their bonds to the flat belt. Failure of a single rib on the belt requires the entire belt to be discarded. Although the stresses on the ribs can be reduced by increasing the diameter of the rollers, a smaller diameter roller is preferred for inspection and sorting purposes because it reduces interference of the conveyor system with the operation of the inspection and sorting system. Forming or bonding the ribs on the surface of the flat belt is expensive and requires special tooling for each lane spacing and rib height configuration used. Another disadvantage of this type of belt is that it tends to wander laterally across the rollers causing misalignment between the inspection and sorting system and the lanes, which further reduces sorting accuracy.

When processing food items, cleanliness of the conveyor system is important. Typically a conveyor belt is washed with a water spray directed onto the underside of the conveyor system then wiped dry by a squeegee blade. However, a ribbed belt is difficult to clean due to the complex topography of its surface. A squeegee cannot be used to dry the ribbed belt. Air knives can be used as a substitute for a squeegee, but are less effective than desired.

U.S. Pat. No. 5,431,289 discloses a conveyor system for aligning articles prior to inspection that comprises a plurality of lanes, each lane formed by two endless side belts separated by an endless central product-carrying belt. The side belts are raised with respect to the central product-carrying belt to define a recessed lane area for containing articles placed therein. The belts form closed loops around a pair of spaced apart rollers, one of which is a drive roller for driving the belts so that they all move at the same speed. The belts are supported by a platen that extends beneath the lanes and spans between infeed and outfeed rollers of the conveyor system. The platen includes channels routed along its length for guiding the belts and further includes lane dividers extending between adjacent lanes and above the side belts of the adjacent lanes. A cleaning system positioned beneath the platen cleans the belts as they travel about the rollers. Changing the size or spacing of the lanes in this conveyor system is difficult and expensive because it requires the platen and central product-carrying belts to be replaced. Due to its complexity, this belt and platen configuration becomes impractical for systems over 24 inches (61 cm) wide. Constant rubbing of the belts of this conveyor system across the platen tends to reduce belt life and cause premature failure of the side belts or the central belts. Failure of one of the side belts or the central belts can leave a gap in the conveyor system where articles can accumulate and jam an adjacent belt.

SUMMARY OF THE INVENTION

An object of the invention is, therefore, to provide a method and an apparatus for conveying articles that are precisely positioned, oriented, and singulated in accurately and precisely positioned lanes formed in a conveying region of a flat product-carrying belt suitable for use with an automated inspection and sorting system.

Another object of the invention is to provide such a laned conveyor apparatus having removable elastic lane separating bands guided along the region of the product-carrying belt by a replaceable guide mechanism to facilitate replacement of the separating bands and reconfiguration of the lanes.

A further object of the invention is to provide such a conveyor apparatus in which the separating bands are pulled away from the underside of the product-carrying belt to facilitate cleaning of the product-carrying belt and the separating bands with a fluid spray or squeegee device.

Yet another object of the invention is to provide such a conveyor apparatus having a tensioning device for tensioning the separating bands to maintain a frictional interface between the separating bands and the product-carrying belt that causes the separating bands to move in coordination with movement of the product-carrying belt.

Still another object of the invention is to provide such a conveyor apparatus in which the separating bands move about the rollers at a pitch diameter that is larger than the pitch diameter of the product-carrying belt so that the separating bands move at a faster linear rate than the product-carrying belt and thereby cause an article riding partly on a separating band and partly on the product-carrying belt to be urged more fully onto the product-carrying belt and into one of the lanes as the article moves along the conveying region.

These and other objects of the invention are accomplished by a conveyor apparatus having an infeed roller and an outfeed roller rotatably mounted to a frame in spaced apart relation and movably supporting a flexible product-carrying belt that forms a closed loop about the respective infeed and outfeed rollers to define a conveying region. The conveying region has a length and a width, the length spanning between infeed and outfeed ends of the conveyor apparatus. A drive mechanism is coupled to the conveyor apparatus, preferably to the infeed roller, for driving the product-carrying belt about the infeed and outfeed rollers in response to an applied motive force. The conveying region is defined by the instantaneous presence of the part of the product-carrying belt traveling from the infeed roller toward the outfeed roller. A plurality of removable elastic separating bands are stretched around the infeed roller, the outfeed roller, and the product-carrying belt and spaced apart at intervals along the width of the conveying region to form lanes along the length of the conveying region. An infeed device is positioned to feed multiple streams of precisely positioned, oriented, and singulated articles into the lanes. The frame is suitable for mounting an inspection and sorting system near the outfeed end of the conveyor apparatus for inspection and sorting of the articles as they are projected from the outfeed end.

The separating bands contact an outer surface of the product-carrying belt to form a frictional interface with the product-carrying belt that causes the separating bands to move in coordination with movement of the product-carrying belt. A guide mechanism is mounted to the frame adjacent the infeed end of the conveyor apparatus and includes multiple guide features spaced apart at intervals along the width of the conveying region for guiding the separating bands so that the lanes are accurately and precisely positioned in relation to the frame. An adjustable tensioning device is provided for tensioning the separating bands across the conveying region and into firm contact with the outer surface of the product-carrying belt near the outfeed roller to ensure that the frictional interface is tight.

The product-carrying belt may be a conventional fabric belt or may be made of a polymer, such as urethane, suitable for food processing use. The separating bands preferably have a trapezoidal cross section to prevent twisting of the separating bands, but can be of other cross sectional shapes, such as round, triangular, or rectangular, for particular sorting or article segregating needs. When color is an attribute of the articles inspected by the inspection and sorting system, the product-carrying belt and the separating bands may be colored to resemble the articles so that the inspection and sorting system can more accurately and efficiently identify unacceptable articles.

The drive mechanism is preferably a rotary stepper motor or electric motor coupled to either the infeed roller or the outfeed roller, but may be a linear drive that is directly coupled to the product-carrying belt or any other mechanism for applying a motive force that drives the product-carrying belt about the infeed and outfeed rollers at speeds ranging from about 200 ft/min to about 1,100 ft/min (61 to 335 m/min).

The guide mechanism includes a guide roller rotatably mounted to the frame and positioned in spatial alignment with the infeed roller outside the closed loop of the product-carrying belt and opposite the outfeed roller. The guide roller includes multiple circumferential grooves sized to fit the separating bands and spaced apart along the width of the guide roller. As the separating bands move about the infeed and outfeed rollers, they pass through the grooves of the guide roller, which are sized to guide the separating bands and restrict lateral movement of the separating bands along the width of the guide roller. The guide roller is conveniently replaceable for changing the spacing of the separating bands or for accommodating separating bands of different sizes or cross-sectional shapes.

In an alternative embodiment, the guide mechanism includes infeed and outfeed guide combs secured to the frame and positioned at the respective infeed and outfeed ends of the conveyor apparatus adjacent to the outer surface of the product-carrying belt. The infeed and outfeed guide combs are shaped to conform to the product-carrying belt as it passes over the respective infeed and outfeed rollers. The infeed and outfeed guide combs each include multiple guide channels that open toward the product-carrying belt. The guide channels are positioned so that the separating bands pass through the guide channels between facing sides of the channels as the separating bands move about the infeed and outfeed rollers. The infeed and outfeed guide combs are replaceably mounted to the frame for convenient conversion of the lane size, lane spacing, or the size or shape of the separating bands, and are aligned with each other to ensure precise positioning of the lanes while minimizing band wear caused by rubbing of the separating bands against the sides of the guide channels.

The tensioning device is a tensioning roller rotatably mounted to the frame in spatial alignment with the infeed and outfeed rollers and positioned for maintaining the tension of the separating bands to ensure a tight frictional interface between the separating bands and the product-carrying belt. The tensioning roller also pulls the separating bands into firm engagement with the circumferential grooves of the guide roller to ensure accurate guidance of the separating bands. The tensioning roller is preferably positioned between the separating bands and a return region of the product-carrying belt opposite the conveying region so that the tensioning roller pulls the separating bands away from the return region to create a gap therebetween. A belt-cleaning device such as a pressurized fluid wash and squeegee device is positioned in the gap to clean the return region of the product-carrying belt. In an alternative embodiment, the tensioning device is a smooth block or rod against which the separating bands slide.

The infeed and outfeed rollers define instantaneous infeed and outfeed roller contacting regions of the respective product-carrying belt and separating bands, which in turn define infeed and outfeed pitch diameters. Because the separating bands ride outside of the product-carrying belt, the infeed and outfeed pitch diameters of the separating bands are necessarily larger than the respective infeed and outfeed pitch diameters of the product-carrying belt. The ratio of the pitch diameter of the separating bands to the pitch diameter of the product-carrying belt, being greater than one, causes the separating bands to move at a faster linear rate than the product-carrying belt as the product-carrying belt and separating bands move around the infeed and outfeed rollers. As a result, an elongated article that is inadvertently placed partly upon one of the separating bands and partly contacting the product-carrying belt will be urged or turned more fully onto the product-carrying belt as the article is carried along the conveying region.

In a preferred embodiment, the diameter of the infeed roller is greater than the diameter of the outfeed roller to maximize the drive force imparted by the infeed roller to the product-carrying belt and to minimize interference of the outfeed end of the conveyor apparatus with the operation of the inspection and sorting apparatus. The smaller diameter of the outfeed roller results in a pitch diameter ratio at the outfeed roller that is greater than the pitch diameter ratio at the infeed roller. The tensioning device and guide mechanism are positioned to pull the separating bands away from the infeed radius region of the product-carrying belt. Pulling the separating bands away from the infeed radius region allows the separating bands to slip over the product-carrying belt at the infeed end and maintains a tight frictional interface at the outfeed end that does not slip. Water is applied to the product-carrying belt at the infeed end to lubricate the infeed end and thereby facilitate slippage of the separating bands at the infeed end. Facilitating slippage at the infeed end minimizes slippage at the outfeed end. Because the pitch diameter ratio at the outfeed end is greater than at the infeed end, minimizing slippage at the outfeed end maximizes the difference between the linear speed of the separating bands and the linear speed of the product-carrying belt.

Additional objects and advantages of this invention will be apparent from the following detailed description of preferred embodiments thereof that proceeds with reference to the accompanying drawings.

DETAILED DESCRIPTION OF PREFERRED EMBODIMENTS

Figure 2:
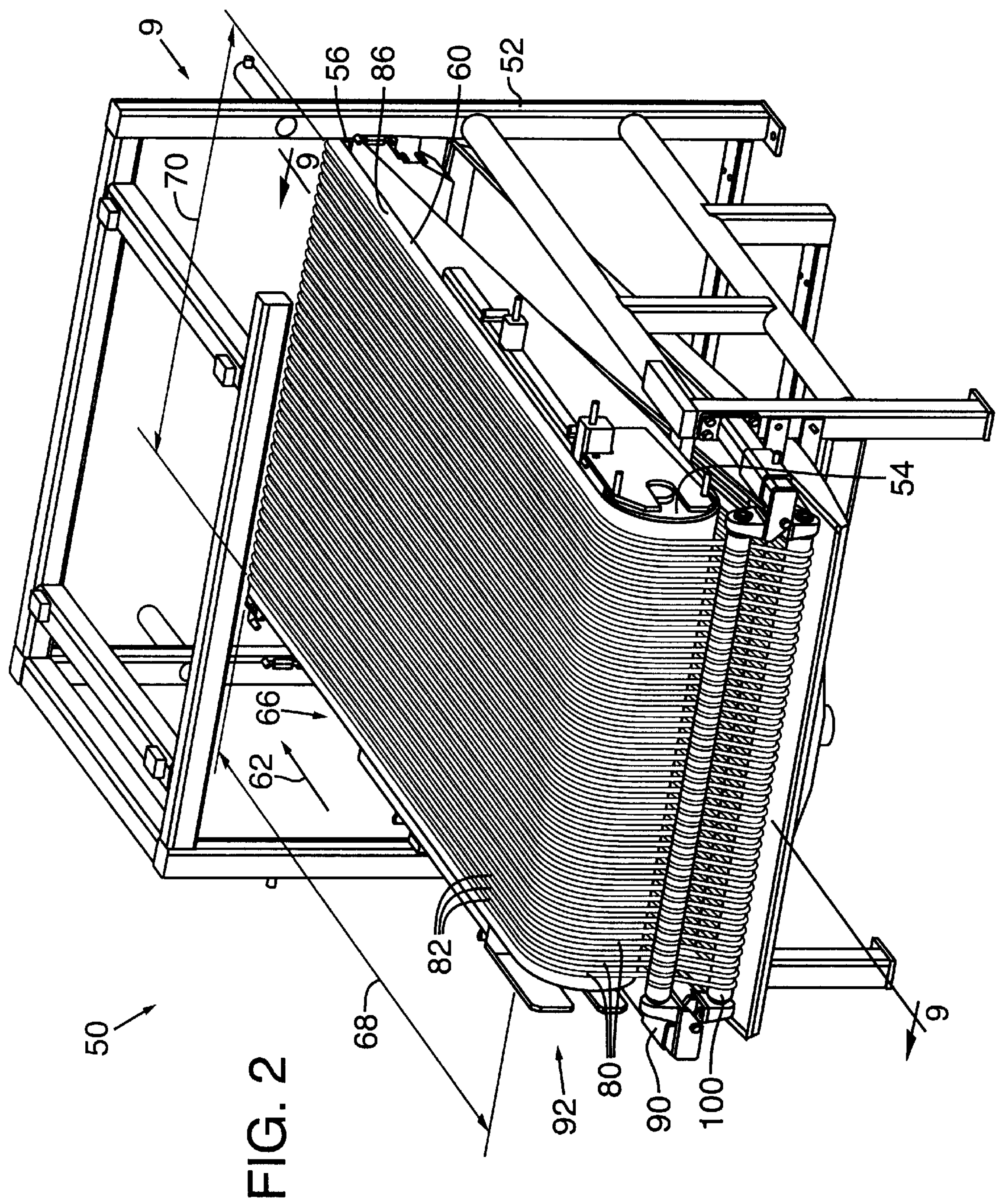
FIG. 2 is an infeed end perspective view of a laned conveyor apparatus in accordance with the present invention.
Figure 3:
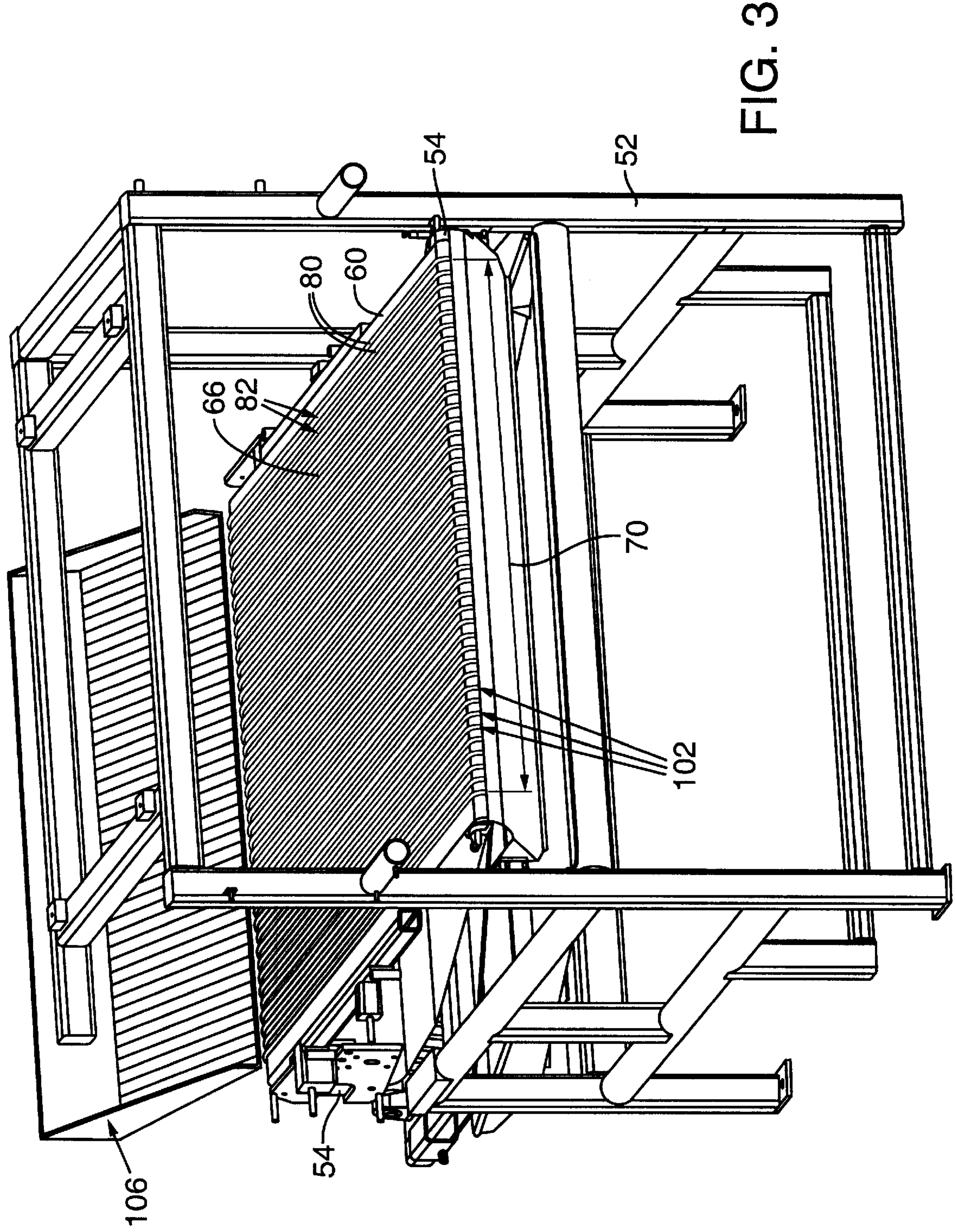
FIG. 3 is an outfeed end perspective view of the conveyor apparatus of FIG. 2 with an infeed device shown schematically.
Figure 4:
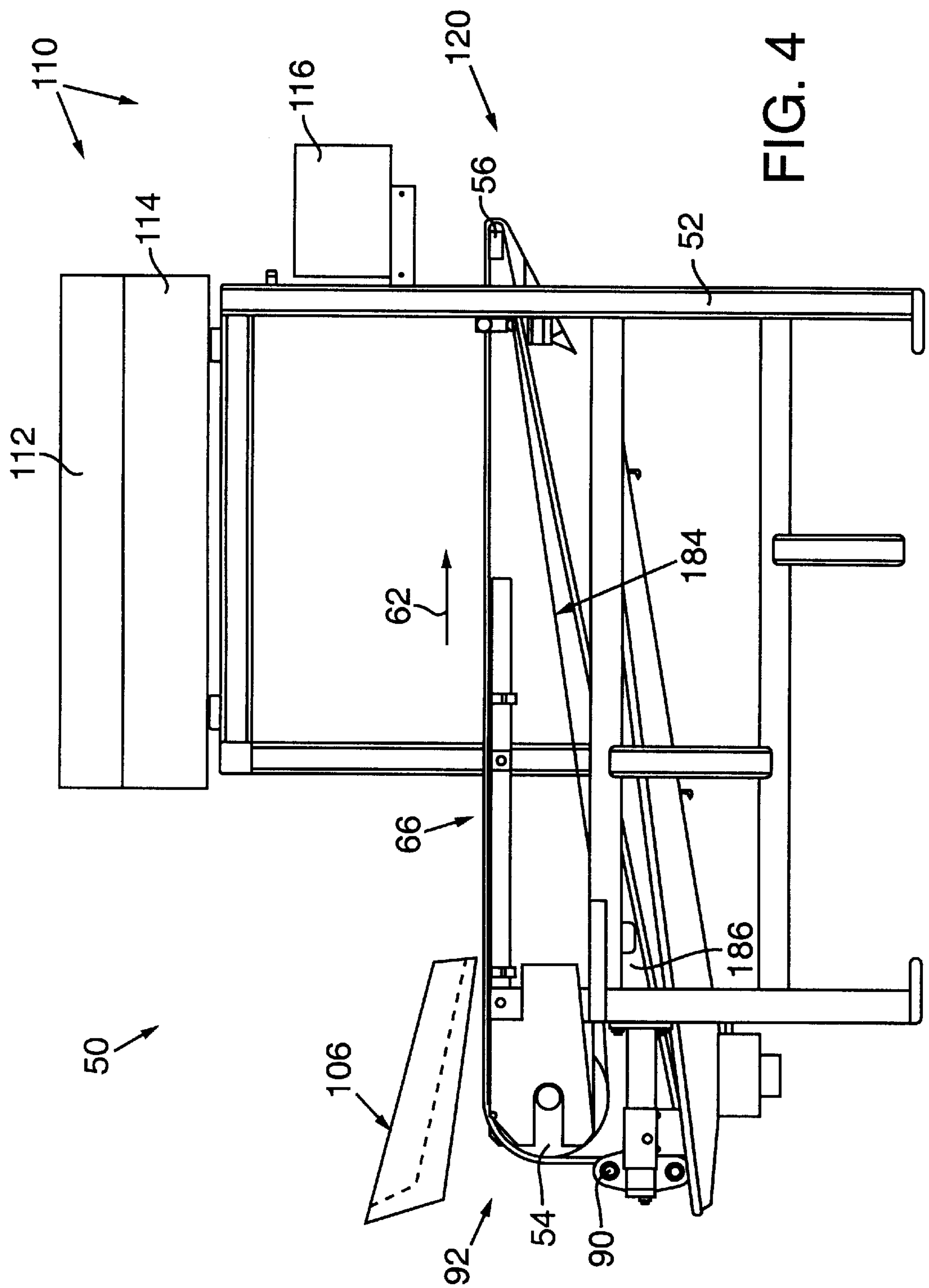
FIG. 4 is a side elevational view of the conveyor apparatus of FIG. 2 with an infeed device and an inspection and sorting system shown schematically.

FIG. 2 shows a pictorial view of a conveyor apparatus 50, which represents a first preferred embodiment of the present invention. FIG. 3 is an outfeed end perspective view of conveyor apparatus 50; and FIG. 4 is a side elevational view of conveyor apparatus 50. With reference to FIGS. 2–4, conveyor apparatus 50 includes a frame 52 on which an infeed roller 54 and an outfeed roller 56 are rotatably mounted in spaced apart relation. A flexible, substantially flat product-carrying belt 60 forms a closed loop about respective infeed and outfeed rollers 54, 56. Product-carrying belt 60 is preferably made of a polymer resin, such as polyurethane or polyvinyl chloride (PVC), suitable for food processing use but may be made of fabric or other conventional conveyor belt material. A drive mechanism (not shown), such as an electric motor, is coupled to conveyor apparatus 50 and preferably rotatably coupled to infeed roller 54 for driving product-carrying belt 60 about infeed and outfeed rollers 54, 56 in a direction 62 at speeds ranging from about 200 ft/min to about 1,100 ft/min (61 to 335 m/min) in response to an applied motive force. A conveying region 66 having a length 68 and a width 70 is defined by the instantaneous presence of product-carrying belt 60 as it travels from infeed roller 54 toward outfeed roller 56.

Multiple elastic separating bands 80 are removably positioned around infeed roller 54, outfeed roller 56, and product-carrying belt 60. Separating bands 80 are spaced apart along width 70 of conveying region 66 to form lanes 82 aligned with length 68 of conveying region 66. Separating bands 80 contact an outer surface 86 of product-carrying belt 60, creating friction between outer surface 86 and separating bands 80 that causes separating bands 80 to move in coordination with movement of product-carrying belt 60. A guide mechanism 90 is mounted to frame 52 adjacent an infeed end 92 of conveyor apparatus for guiding separating bands 80 so that lanes 82 are accurately and precisely maintained in position relative to frame 52. An adjustable tensioning device 100 is provided for tensioning separating bands 80 across conveying region 66 to maintain a tight frictional interface 102 for driving separating bands 80 in coordination with product-carrying belt 60.

Figure 1:
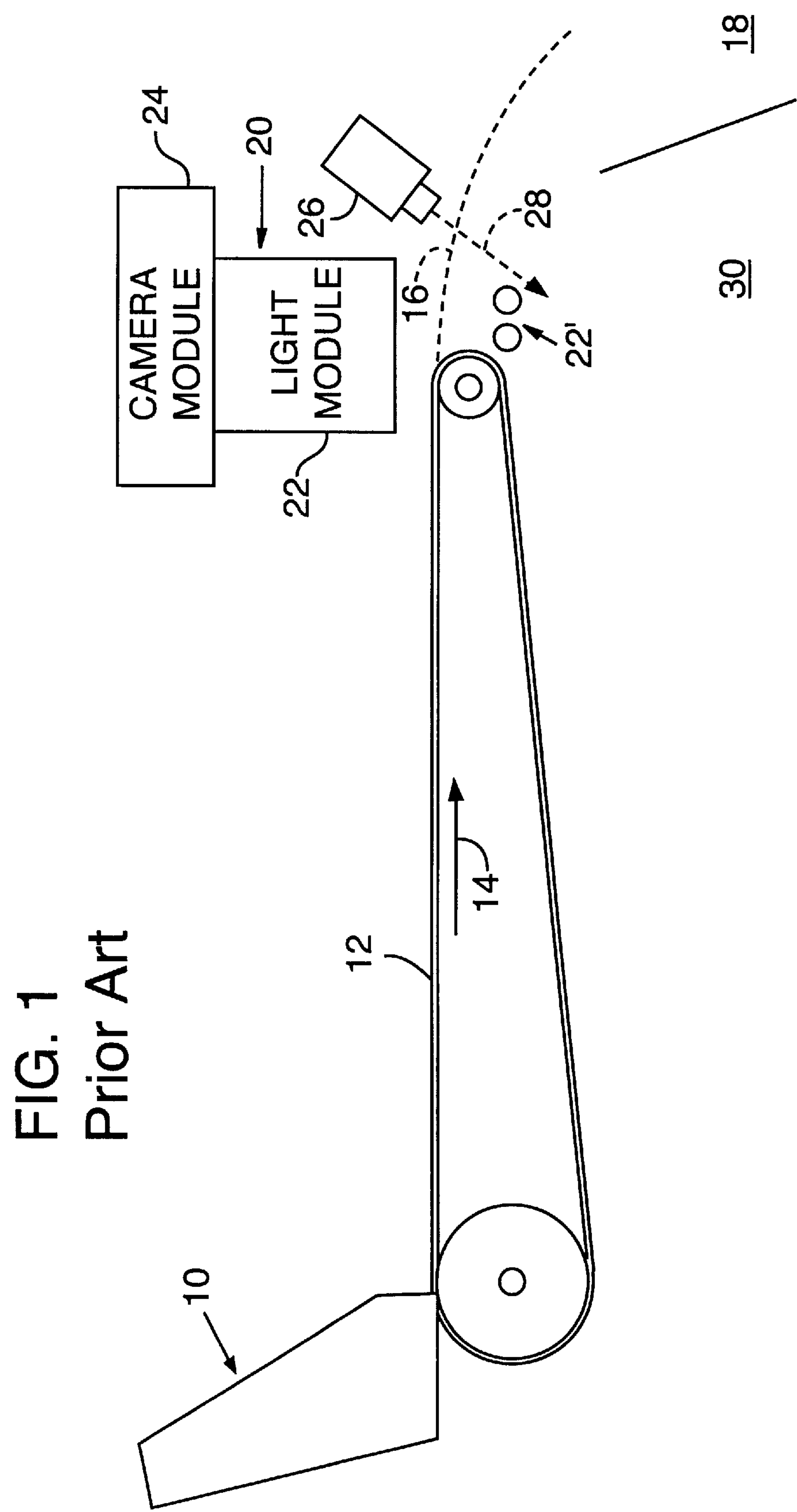
FIG. 1 is a schematic side elevation view of a prior art automated bulk processing system including a conventional conveyor system.

An infeed device 106 is positioned to feed multiple streams of articles (not shown) into lanes 82. Infeed device 106 may be a vibrating feed chute, a nonvibrating chute, a shaker apparatus or other device for feeding articles into lanes 82. Infeed device 106 may comprise multiple laned or nonlaned feed devices that gradually accelerate the articles before depositing them into lanes 82. An inspection and sorting system 110 (FIG. 4) is also shown schematically and includes an inspection device 112, a lighting module 114, and a sorting device 116, all mounted to frame 52 near an outfeed end 120 of conveyor apparatus 50. Inspection device 112 inspects articles as they travel along conveying region 66 or as they are projected from outfeed end 120 of conveyor apparatus 50 in the conventional manner shown in FIG. 1. An inspection and treatment system (not shown) may be used in the place of inspection and sorting system 110 to inspect the articles and treat selected articles. When inspecting articles as they are projected from outfeed end 120, the laned configuration of conveyor apparatus 50 projects the articles in article streams separated by spaces generally equivalent to the width of each separating band 80.

Figure 5:
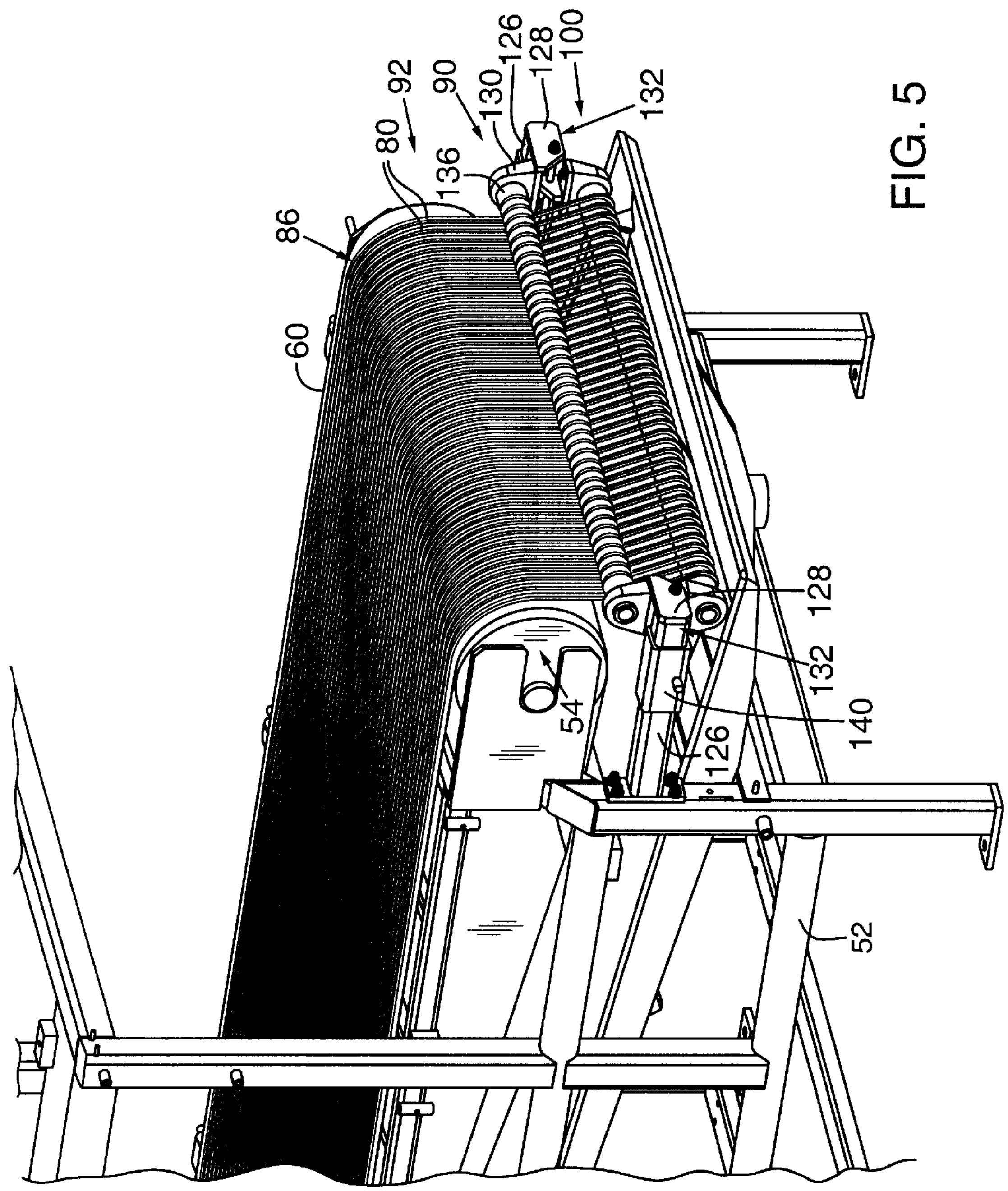
FIG. 5 is an enlarged partial perspective view of the infeed end of the conveyor apparatus of FIG. 2.
Figure 6:
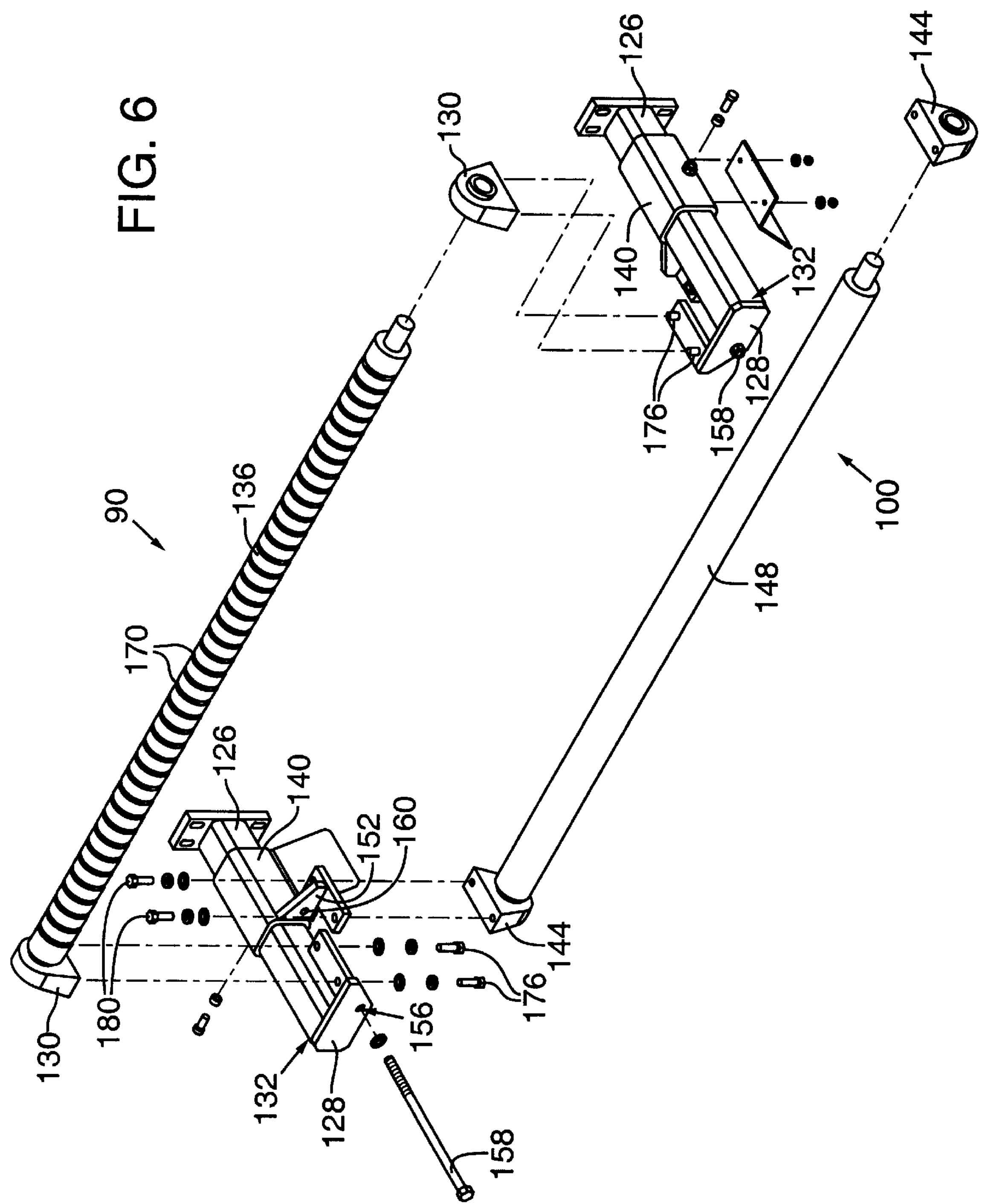
FIG. 6 is an enlarged exploded assembly view of the guide mechanism and tensioning device of the conveyor apparatus of FIG. 2.

FIG. 5 is a partial prospective view of conveyor apparatus 50 showing infeed end 92, guide mechanism 90, and tensioning device 100. FIG. 6 shows an exploded assembly view of guide mechanism 90 and tensioning device 100. With reference to FIGS. 5 and 6, a pair of roller support arms 126 are mounted to frame 52 beneath the closed loop of product-carrying belt 60 and extend beyond infeed end 92 of conveyor apparatus 50. A pair of end plates 128 are securely mounted to distal ends 132 of roller support arms 126. A pair of guide roller bearings 130 are removably secured to end plates 128 to rotatably support a guide roller 136 extending therebetween in spatial alignment with infeed roller 54.

Tensioning device 100 includes a pair of tensioning roller support tubes 140 slidably mounted to roller support arms 126. A pair of tensioning roller bearings 144 are removably mounted to tensioning roller support tubes 140 to rotatably support a tensioning roller 148 extending therebetween. A gusset 152 is securely connected to each of the tensioning roller support tubes 140 and extends in a direction generally transverse of roller support arms 126. A hole 156 in each end plate 128 receives a tension adjustment bolt 158 that is threaded into a threaded hole 160 in gusset 152 that is aligned with hole 156.

Guide roller 136 includes guide features that preferably comprise multiple circumferential grooves 170 longitudinally spaced apart along guide roller 136 and sized to fit separating bands 80. As separating bands 80 move about infeed and outfeed rollers 54, 56 they pass through grooves 170 and around tensioning roller 148. The position of tensioning roller 148 along roller support arms 126 is adjusted by turning tension adjustment bolts 158 to apply tension to separating bands 80 and seat separating bands 80 in grooves 170 to thereby restrict lateral movement of separating bands 80 along guide roller 136. To facilitate replacement of worn or broken separating bands 80 or to change the size or spacing of separating bands 80, guide roller 136 may be easily removed by loosening or removing a pair of guide roller mounting screws 176 that secure guide roller bearings 130 to roller support arms 126. Similarly, tensioning roller 148 may be removed by loosening or removing a pair of tensioning roller mounting screws 180 that connect tensioning roller bearings 144 to tensioning roller support tubes 140.

Tensioning device 100 is positioned to pull separating bands 80 away from an instantaneous return region 184 (FIG. 4) of product-carrying belt 60 to create a gap 186 within which a cleaning device (not shown) may be positioned for cleaning product-carrying belt 60. The cleaning device may include nozzles for providing a high-pressure spray of cleaning fluid or water, a scrubber mechanism, a squeegee, or a combination thereof that will remove unwanted debris and liquid from separating bands 80 and outer surface 86 of product-carrying belt 60. The position of tensioning device 100 also causes frictional interface 102 to be localized primarily at outfeed end 120.

Figure 7:
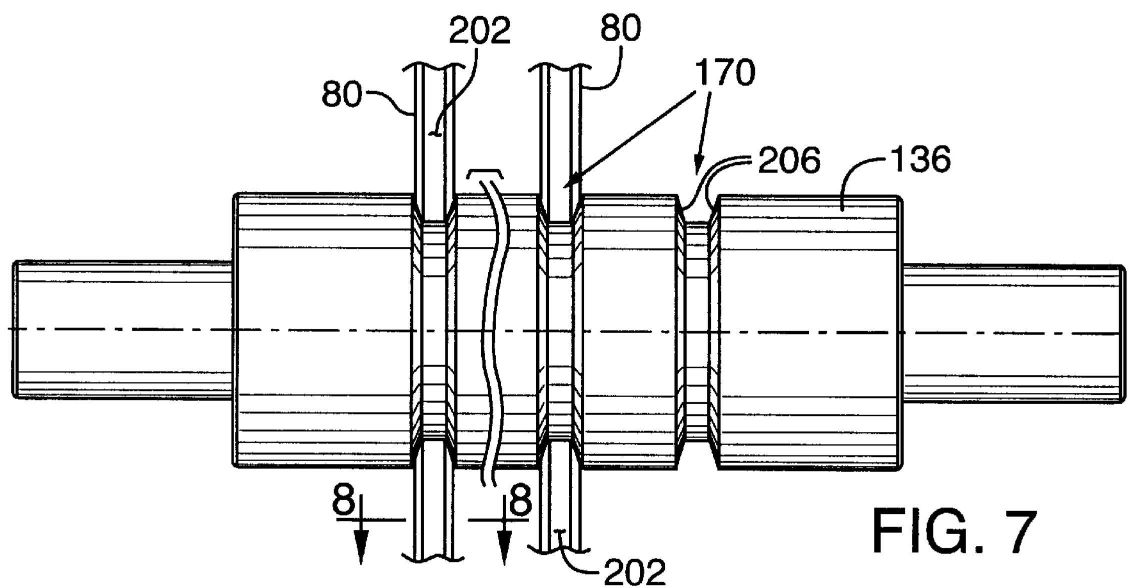
FIG. 7 is an enlarged fragmentary elevational view of the guide roller and separating bands of the conveyor apparatus of FIG. 2.
Figure 8:
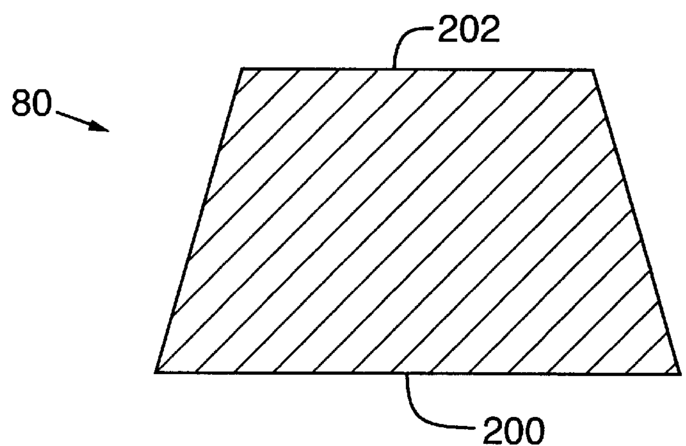
FIG. 8 is an enlarged cross-sectional view of one of the separating bands of the conveyor apparatus taken along line 8—8 of FIG. 7.

FIG. 7 shows an enlarged fragmentary elevational view of guide roller 136 and separating bands 80. FIG. 8 shows an enlarged cross-sectional view of a separating band 80 taken along line 8—8 of FIG. 7. With reference to FIGS. 7 and 8, each separating band 80 has a trapezoidal cross section having opposing major and minor surfaces 200, 202. Separating bands 80 are placed around product-carrying belt 60 (FIG. 5) so that major surface 200 of each separating band 80 contacts outer surface 86 of product-carrying belt 60. Each groove 170 of guide roller 136 includes side walls 206 that are tapered to receive separating band 80, which passes through groove 170 with minor surface 202 facing groove 170. The trapezoidal cross-sectional shape of each separating band 80 prevents it from twisting as it travels around infeed and outfeed rollers 54, 56 and prevents it from being pinched within or jumping out of groove 170.

Separating bands 80 are preferably made of commercially available V-belting material that is formed of an extruded polymer resin, such as urethane, suitable for food processing use. A suitable V-belting material is made by Eagle Belting Company, Des Plaines, Ill., part No. 3L. To assemble separating bands 80, the V-belting material is cut into equal length segments, then the ends of each segment are welded together so that each segment forms a closed loop. The segments are sized so that separating bands 80 will be placed under tension when installed on conveyor apparatus 50 and around tensioning device 100. The appropriate amount of tension is a function of the elastic modulus of the separating band material and the tension necessary to avoid slippage at frictional interface 102. Separating bands 80 made of urethane are sized so that they will be stretched after installation by an amount ranging from approximately 5 to 10 percent of the initial segment length. Tensioning device 100 may be occasionally adjusted to maintain optimal tension as separating bands 80 stretch or wear.

Figure 9:
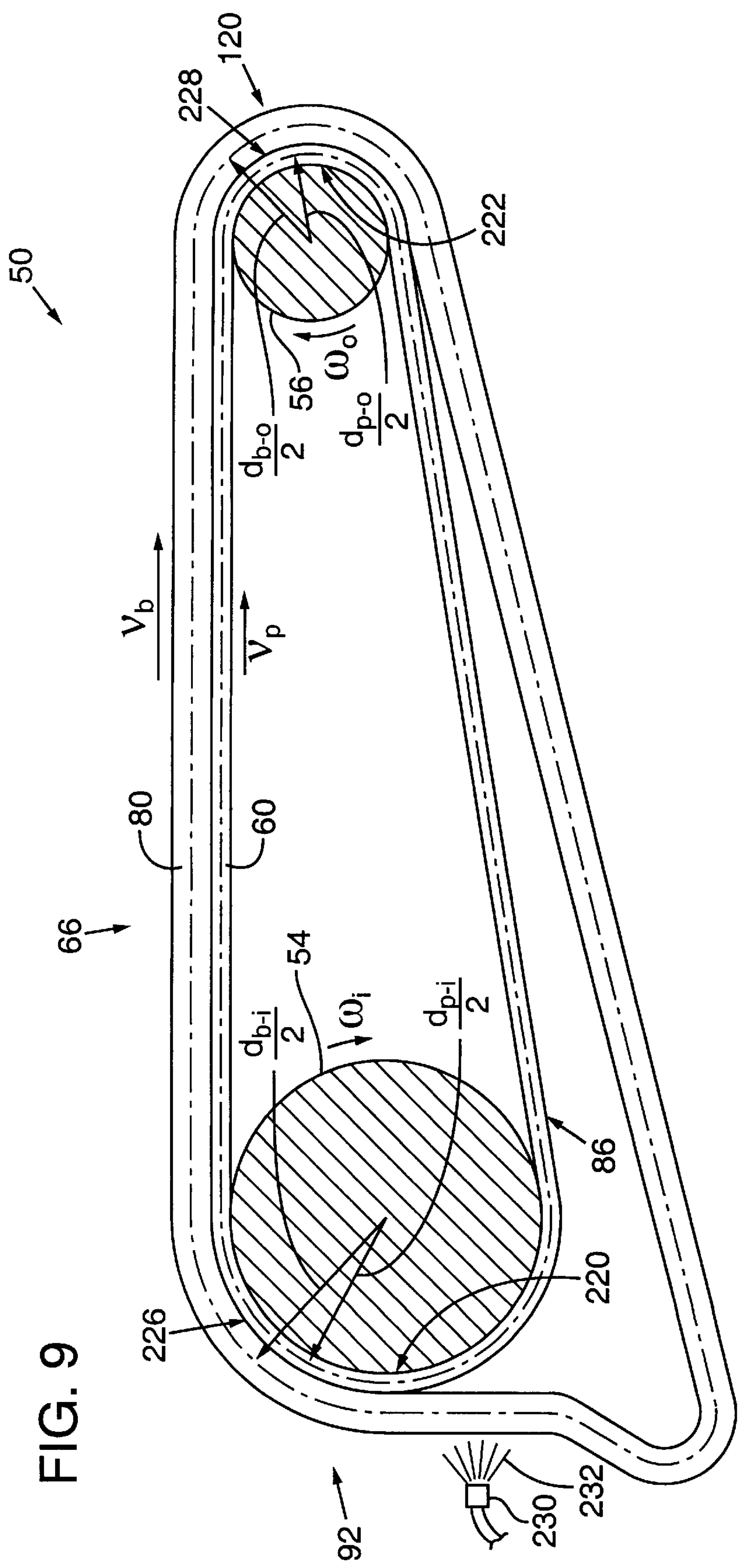
FIG. 9 is a schematic cross-sectional view of the conveyor apparatus taken along line 9—9 of FIG. 2 with the frame, the guide mechanism, and the tensioning device omitted.

FIG. 9 shows a schematic cross-sectional view taken along line 9—9 of FIG. 2 showing infeed and outfeed rollers 54, 56, product-carrying belt 60, and one of the separating bands 80 of conveyor apparatus 50. Sizes of the parts of conveyor apparatus 50 shown in FIG. 7 have been exaggerated for clarity. Guide mechanism 90 and tensioning device 100 have been omitted from FIG. 7. With reference to FIG. 7, infeed and outfeed rollers 54, 56 define respective instantaneous infeed and outfeed roller contact regions 220, 222 of product-carrying belt 60 and respective instantaneous infeed and outfeed surface contact regions 226, 228 of separating bands 80. Given an angular velocity $\omega_i$ of infeed roller 54 as driven by the drive mechanism, a linear velocity $v_p$ of product-carrying belt 60 is defined as:

$$v_p = \omega_i \times d_{p-i}$$

where $d_{p-i}$ is the theoretical infeed pitch diameter of product carrying belt 60 (FIG. 7 shows pitch radiuses as d/2). Outfeed roller 56, being freely rotatable, is driven at an angular velocity $\omega_o$ that is defined by the linear velocity $v_p$ and theoretical outfeed pitch diameter $d_{p-o}$, of product-carrying belt 60:

$$\omega_o = \frac{v_p}{d_{p-o}}$$

Because separating bands 80 ride outside of product-carrying belt 60, each of the separating bands 80 includes a theoretical infeed pitch diameter $d_{b-i}$ and a theoretical outfeed pitch diameter $d_{b-o}$ that are larger than respective infeed and outfeed pitch diameters $d_{p-i}$ and $d_{p-o}$ of product-carrying belt 60. These larger pitch diameters result in movement of separating bands 80 at a slightly faster linear velocity $v_b$ than product-carrying belt 60 so that separating bands 80 slide along product-carrying belt 60 as product-carrying belt 60 and separating bands 80 traverse conveying region 66.

The linear velocity $v_b$ of separating bands 80 is a function of the angular velocity of the rollers and the pitch diameter of separating bands 80. Outfeed roller 56 is sized so that outfeed end 120 of conveyor apparatus 50 will not interfere with the operation of inspection and sorting system 110. In a preferred embodiment, outfeed roller 56 is approximately 1.5 inches (3.8 cm) in diameter. Infeed roller 54 is much larger in diameter than outfeed roller 56 to provide sufficient frictional contact area for transferring drive force from infeed roller 54 to product-carrying belt 60 with negligible slippage. These practical constraints result in a pitch diameter ratio ($d_{b-i}/d_{p-i}$) at infeed end 92 that is significantly less than the corresponding pitch diameter ratio ($d_{b-o}/d_{p-o}$) at outfeed end 120. The difference in the pitch diameter ratios of the preferred embodiment requires that slippage must occur at one of the contact regions 220, 222, 226, 228. Such slippage would not occur in an alternative embodiment (not shown) having infeed and outfeed rollers of the same size, because the infeed and outfeed pitch diameter ratios in such an embodiment would be equal. However, a conveyor apparatus having equally-sized infeed and outfeed rollers would be impractical for the reasons described above.

To reduce belt wear and stress, guide mechanism 90 and tensioning device 100 are positioned to pull separating bands 80 away from a portion of infeed roller 54, which causes substantially all slippage to occur at infeed surface contact region 226. A nozzle 230 sprays a fluid 232, such as water, upon outer surface 86 product-carrying belt 60 to lubricate infeed surface contact region 226 and facilitate the concentration at infeed surface contact region 226 of the slippage of conveyor apparatus 50. Thus the linear velocity $v_b$ of separating bands 80 can be defined as a function of the outfeed pitch diameter ratio ($d_{b-o}/d_{p-o}$) and the linear velocity ($v_p$) of product-carrying belt 60:

$$v_b = \omega_o \times d_{p-o} = v_p \times \frac{d_{b-o}}{d_{p-o}}$$

By nonlimiting example, if the outfeed pitch diameter ($d_{p-o}$) of product-carrying belt is 1.55 inches (3.94 cm) and the outfeed pitch diameter ($d_{b-o}$) is 1.75 inches (4.45 cm), then the outfeed pitch diameter ratio $d_{b-o}/d_{p-o}$ will be 1.129 and separating bands 80 will move 12.9 percent faster than product-carrying belt 60. Thus, if product-carrying belt 60 is driven at a speed of 1000 ft/min (304 m/min), separating bands 80 will move at a linear velocity $v_b$ of 1129 ft/min (344 m/min). This example assumes that no slippage occurs at outfeed end 120 (at outfeed contact regions 222 and 228) or at infeed radius contact region 220.

Figure 10A:
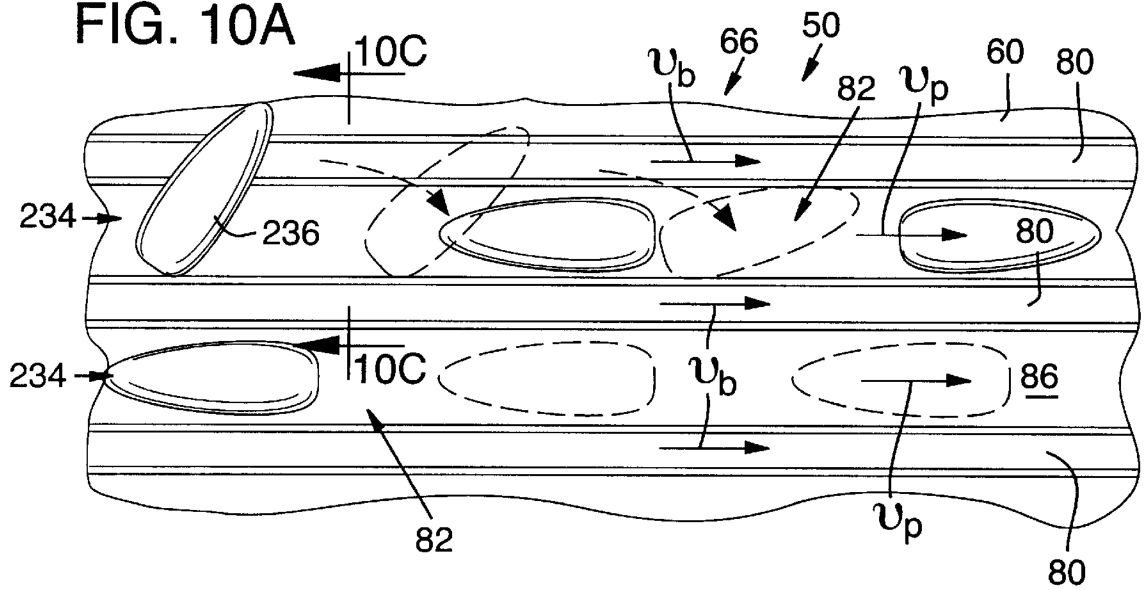
FIGS. 10A and 10B are enlarged sequential top plan views of a portion of a conveying region of the conveyor apparatus of FIG. 2, showing of articles as they are conveyed along the conveying region.
Figure 10B:
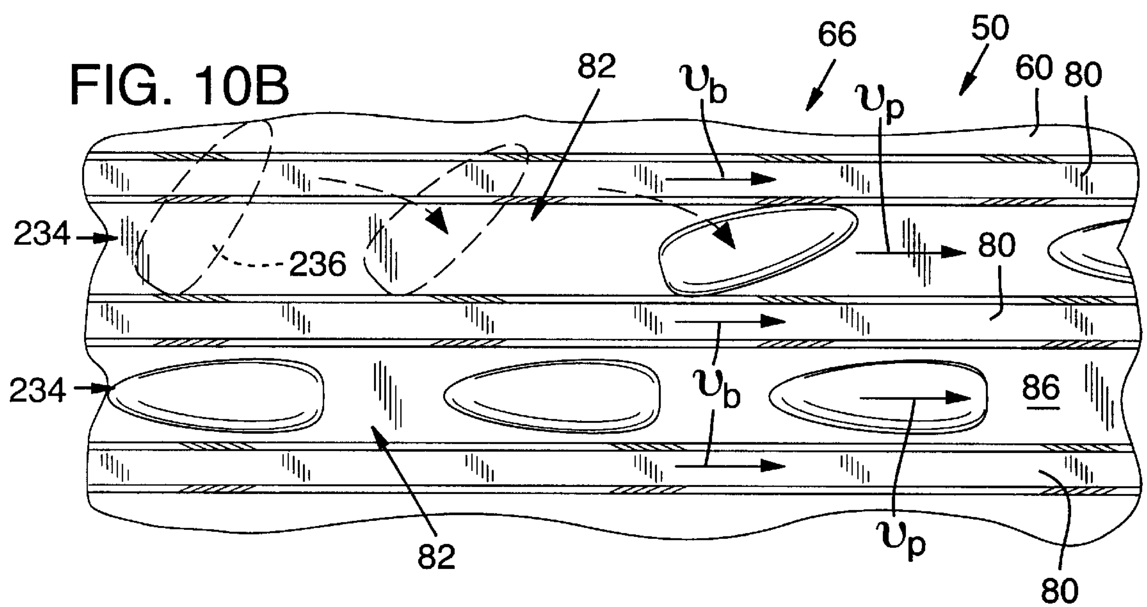
Figure 10C:
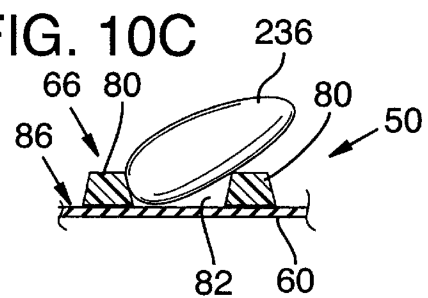
FIG. 10C is a cross-sectional view of the conveyor apparatus of FIG. 2 and an overlying article conveyed thereon taken along line 10C—10C of FIG. 10A.

FIGS. 10A and 10B are enlarged top plan views of a portion of conveying region 66 that are sequential to illustrate the effect of the difference in linear velocities of separating bands 80 ($v_b$) and product-carrying belt 60 ($v_p$). FIG. 10C is a cross-sectional view of a portion of conveying region 66 taken along line 10C—10C of FIG. 10A. With reference to FIGS. 10A, 10B, and 10C, an article stream 234 includes an overlying article 236 that is partly supported by one of the separating bands 80 and partly supported by outer surface 86 of product-carrying belt 60. As overlying article 236 is carried along conveying region 66 it is urged or turned more fully onto product-carrying belt 60 and into lane 82. The ability to turn overlying articles is advantageous because it maintains segregation of adjacent article streams 234 that are fed into adjacent lanes 82. Better segregation reduces the occurrence of inadvertent rejection of articles by inspection and sorting system 110 at outfeed end 120.

Figure 11:
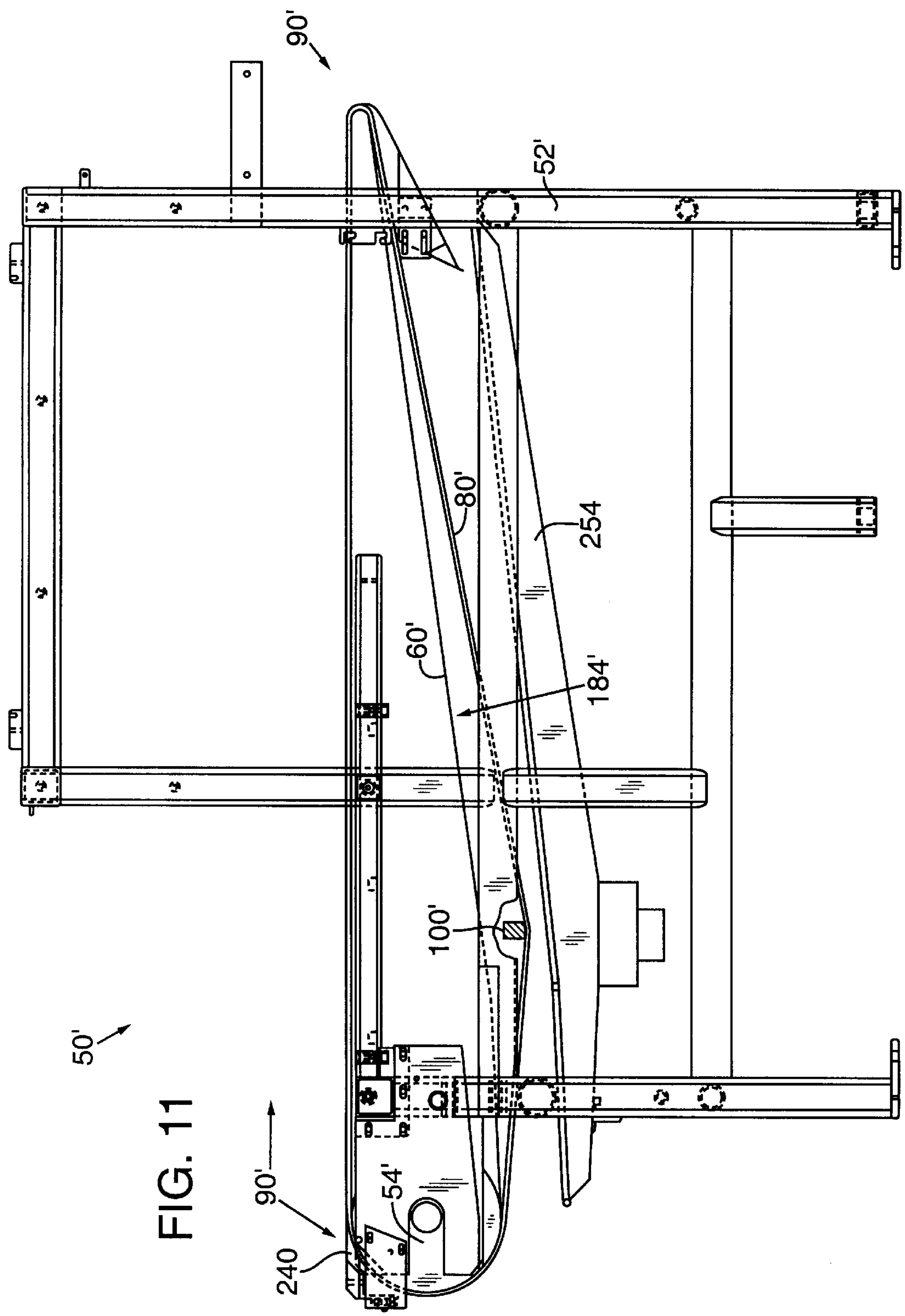
FIG. 11 is a side elevational view of a laned conveyor apparatus in accordance with the present invention showing an alternative guide mechanism and an alternative tensioning device.
Figure 12:
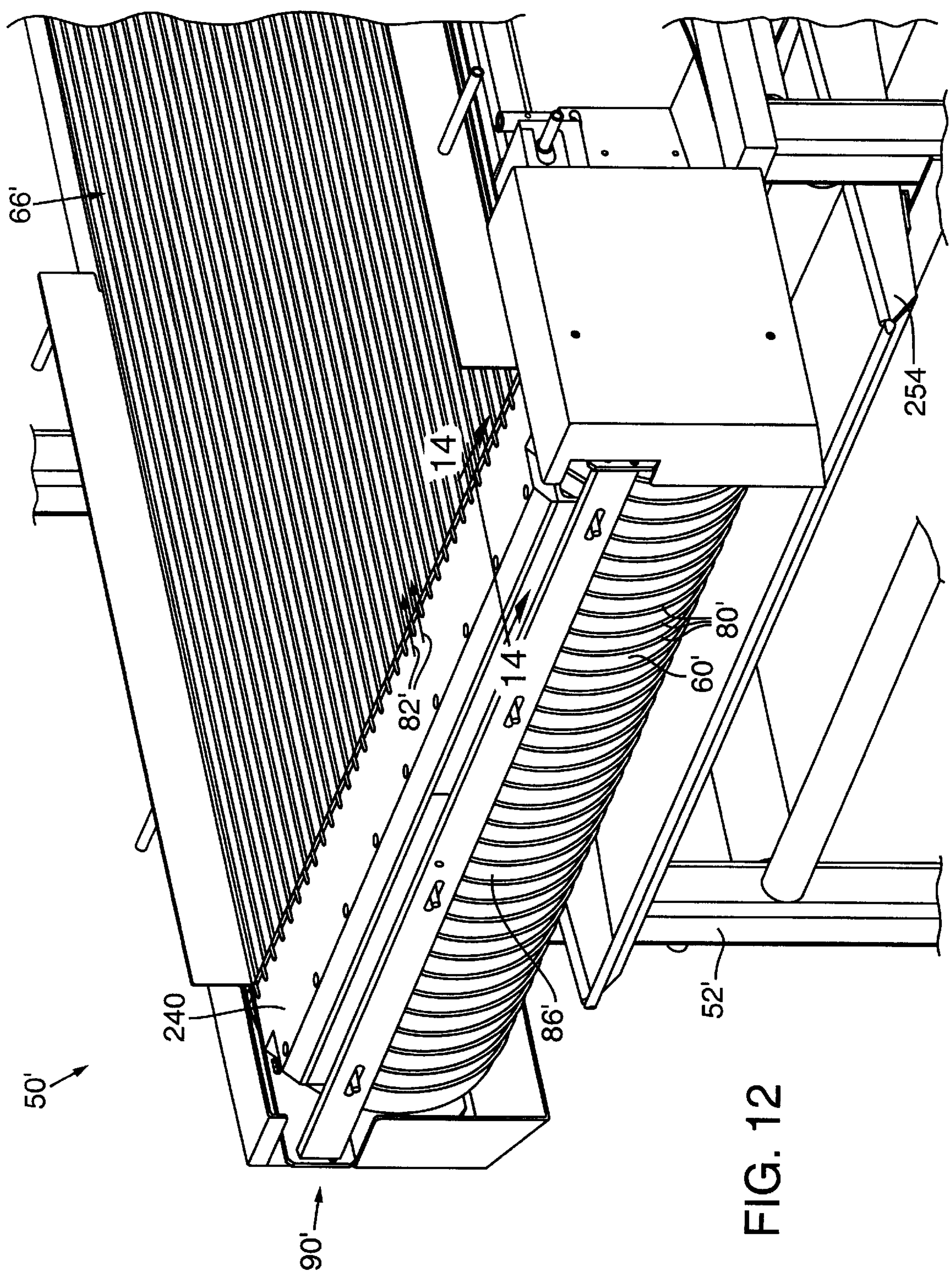
FIG. 12 is an enlarged perspective view of the infeed end of the conveyor apparatus of FIG. 11 showing the infeed guide comb.
Figure 13:
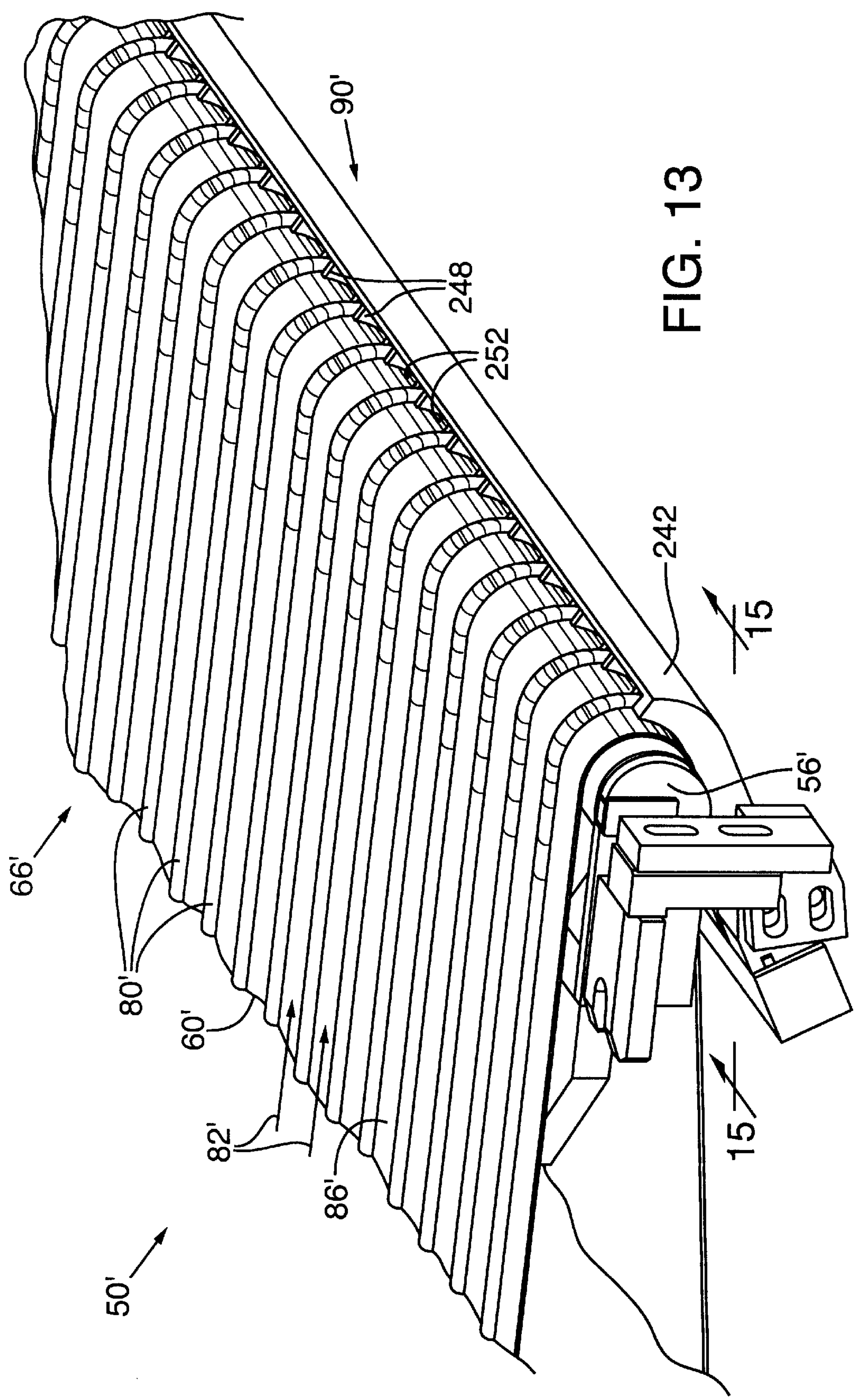
FIG. 13 is an enlarged perspective view of the outfeed end of the conveyor apparatus of FIG. 11 showing the outfeed guide comb.

FIG. 11 is a side elevational view of a second embodiment conveyor apparatus 50' of the present invention. FIG. 12 is an infeed end perspective view of conveyor apparatus 50'. FIG. 13 is a partial outfeed end perspective view of conveyor apparatus 50'. With reference to FIGS. 11–13, conveyor apparatus 50' includes a product-carrying belt 60' and separating bands 80' arranged around an infeed roller 54' and an outfeed roller 56' that are rotatably mounted to a frame 52' in a manner similar to that of the first embodiment conveyor apparatus 50 (FIG. 2). A guide mechanism 90' includes an infeed guide comb 240 secured to frame 52' and positioned adjacent outer surface 86' of product-carrying belt 60' near infeed roller 54'. Guide mechanism 90' also includes an outfeed guide comb 242 secured to frame 52' and positioned adjacent outer surface 86' of product-carrying belt 60' near outfeed roller 56'. A portion of frame 52' is cut away in FIG. 11 to show a tensioning device 100' positioned between an instantaneous return region 184' of product-carrying belt 60' and separating bands 80'. Tensioning device 100' may be an idler roller or a smooth block or rod against which separating bands 80' slide. Tensioning device 100' pulls separating bands 80' away from return region 184' and thereby creates a gap 186' to facilitate cleaning of product-carrying belt 60'.

Figure 14:
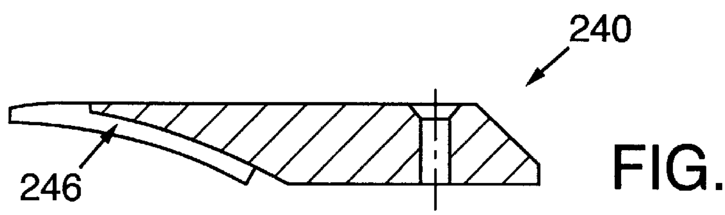
FIG. 14 is a cross-sectional view of the infeed guide comb of the conveyor apparatus of FIG. 11 taken along line 14—14 of FIG. 12.
Figure 15:
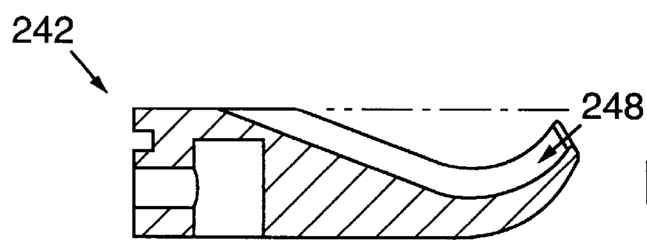
FIG. 15 is a cross-sectional view of the infeed guide comb of the conveyor apparatus of FIG. 11 taken along line 15—15 of FIG. 13.

FIGS. 14 and 15 are cross-sectional views of respective infeed and outfeed guide combs 240, 242 taken along lines 14—14 and 15—15 of FIGS. 12 and 13, respectively. With reference to FIGS. 12–15, infeed and outfeed guide combs 240, 242 are shaped to conform to product-carrying belt 60' as it passes over respective infeed and outfeed rollers 54', 56'. Infeed and outfeed guide combs 240, 242 include multiple respective infeed and outfeed guide channels 246, 248 that open toward product-carrying belt 60'. Infeed and outfeed guide channels 246, 248 are positioned so that separating bands 80' pass through guide channels 246, 248 as separating bands 80' move about respective infeed and outfeed rollers 54', 56'. Infeed and outfeed guide combs 240, 242 are replaceably mounted to frame 52' for convenient conversion of lane size, lane spacing, or the size or shape of separating bands 80', or replacement of worn or damaged separating bands 80'. Infeed and outfeed guide combs 240, 242 are precisely aligned with each other to insure accurate positioning of lanes 82' formed by separating bands 80' as they travel along conveying region 66'.

Outfeed guide comb 242 includes scoop channels 252 positioned between adjacent outfeed guide channels 248 that are positioned to catch water and stray product debris (not shown) thrown from product-carrying belt 60' as it turns about outfeed roller 56'. Scoop channels 252 funnel the water and stray product debris to a catch pan 254 placed beneath conveyor apparatus 50'. Infeed and outfeed guide combs 240, 242 may be formed of metal but are preferably made of a machineable, polymer resin, such as ultra-high molecular weight (UHMW) resin or DELRIN, to reduce friction against separating bands 80' and to lower manufacturing costs. Separating bands 80' of conveyor apparatus 50' preferably have a circular cross section to facilitate their guidance by guide mechanism 90' but may be of other cross sections, such as trapezoidal or rectangular.

It will be obvious to those having skill in the art that many changes may be made to the details of the above-described embodiments of this invention without departing from the underlying principles thereof. The scope of the present invention should, therefore, be determined only by the following claims.

What is claimed is:

1. A conveyor apparatus for segregating articles, comprising:

an infeed roller;

an outfeed roller spaced apart from the infeed roller;

a product-carrying belt forming a closed loop around the infeed and outfeed rollers, the product-carrying belt movable about the infeed and ourfeed rollers and defining an instantaneous conveying region having a length spanning between the infeed and outfeed rollers and a width, one of the infeed and outfeed rollers defining an instantaneous roller surface contacting region of the product carrying belt;

a plurality of endless elastic separating bands removably positioned around the infeed and outfeed rollers and the product-carrying belt, the separating bands contacting the product-carrying belt to form a frictional interface that causes the separating bands to move in coordination with movement of the product-carrying belt, the roller surface contacting region defining a pitch diameter of the product-carrying belt and a pitch diameter of the separating bands, the ratio of the pitch diameter of the separating bands to the pitch diameter of the product-carrying belt defining a pitch diameter ratio;

a drive mechanism operatively coupled to the product-carrying bell for driving the product-carrying belt at a linear belt velocity, the pitch diameter ratio resulting in the movement of the separating bands, when driven by the movement of the product-carrying belt, at a linear band velocity that is faster than the linear belt velocity of the produce-carrying belt; and a guide mechanism having multiple guide features spaced apart at intervals along the width of the conveying region for determining the position of the separating bands along the width of the conveying region, the separating bands forming multiple lanes along the conveying region.

2. The conveyor apparatus of claim 1, further comprising an adjustable tensioning device for tensioning the separating bands across the conveying region.

3. The conveyor apparatus of claim 2 in which:

the roller surface contacting region includes an infeed roller surface contacting region of the product-carrying belt adjacent the infeed roller and an outfeed roller surface contacting region of the product-carrying belt adjacent the outfeed roller;

the product-carrying belt includes an instantaneous infeed radius region opposite the infeed roller surface contacting region and an instantaneous outfeed radius region opposite the outfeed roller surface contacting region;

the pitch diameter ratio includes an infeed pitch diameter ratio and an outfeed pitch diameter ratio;

the outfeed roller is smaller in diameter than the infeed roller so that the outfeed pitch diameter ratio is greater than the infeed pitch diameter ratio; and the tensioning device is positioned to minimize contact of the separating bands with the infeed radius region of the product-carrying belt and to maximize contact of the separating bands with the outfeed radius region and thereby maximize the difference between the linear band velocity and the linear belt velocity.

4. The conveyor apparatus of claim 2 in which the tensioning device includes a tensioning roller positioned between the product-carrying belt and the separating bands.

5. The conveyor apparatus of claim 2 in which the product-carrying belt, the infeed roller, and the outfeed roller define an instantaneous return region of the product-carrying belt opposite the conveying region, and the tensioning device pulls the separating bands away from the return region to form a gap between the separating bands and the return region, and further comprising:

a cleaning device positioned in the gap for cleaning the product-carrying belt.

6. The conveyor apparatus of claim 1 in which:

the articles include acceptable articles and unacceptable articles; and the product carrying belt and the separating bands are of a color that resembles the color of the acceptable articles for facilitating the sorting of the unacceptable articles by an automated inspection and sorting system.

7. The conveyor apparatus of claim 1 in which the guide mechanism is conveniently replaceable for changing the spacing of the separating bands.

8. The conveyor apparatus of claim 1 in which the guide mechanism includes a guide roller having a width and multiple circumferential grooves spaced apart along the width of the guide roller, the grooves sized to receive the separating bands for accurately positioning the separating bands along the width of the conveying region.

9. The conveyor apparatus of claim 8, further comprising a tensioning device for tensioning the separating bands across the conveying region and into engagement with the grooves of the guide roller.

10. The conveyor apparatus of claim 1 in which the product-carrying belt includes an outer surface and the guide mechanism includes:

an infeed guide having infeed guide channels positioned adjacent the outer surface of the product-carrying belt proximal to the infeed roller; and an outfeed guide having outfeed guide channels positioned adjacent the outer surface of the product-carrying belt proximal to the outfeed roller, the separating bands positioned to pass through the respective infeed and outfeed guide channels, the infeed and outfeed guide channels positioned in spatial alignment so that the separating bands are maintained in alignment with the product-carrying belt.

11. A method of segregating two or more streams of articles, comprising:

providing a conveyor apparatus having an infeed roller and an outfeed roller and a product-carrying belt forming a closed loop around the infeed and outfeed rollers to define a conveying region for conveying the streams of articles, the conveying region having a length spanning between the infeed and outfeed rollers and a width, the product-carrying belt including an instantaneous infeed roller surface contacting region, an instantaneous outfeed roller surface contacting region, and instantaneous infeed and outfeed radius regions opposite the respective infeed and outfeed roller surface contacting regions, the infeed and outfeed roller surface contacting regions defining an effective pitch diameter of the product-carrying belt;

placing a plurality of elastic separating bands in contact with the product-carrying belt, the separating bands positioned in alignment with the length of the conveying region to form a frictional interface with the product-carrying belt, at least one of the infeed and outfeed radius regions of the product-carrying belt defining an effective pitch diameter of the separating bands that is greater than the effective pitch diameter of the product-carrying belt;

guiding The separating bands to maintain the position of tee separating bands at a plurality of predetermined intervals along the width of the conveying region to form a plurality of lanes, the lanes sized to accommodate the streams of articles;

feeding the streams of articles into the lanes so that the separating bands segregate the streams of articles, at least one of the streams of articles including an overlying article positioned in the conveying region partly within one of the lanes so that the overlying article rides on both the product-carrying belt and one of the separating bands; and moving the product-carrying belt about the infeed and outfeed rollers, the frictional interface between the product-carrying belt and the separating bands causing the separating bands to move in coordination with the movement of the product-carrying belt, the difference between the effective pitch diameter of the separating bands and the effective pitch diameter of the producer-carrying belt causing the separating bands to move at a linear velocity that is faster than the linear velocity of movement of the product-carrying belt so that fee overlying article is urged into said lane as the overlying article travels along the conveying region.

12. A conveyor apparatus for segregating articles, comprising:

an infeed roller;

an ourfeed roller spaced apart from the infeed roller;

an endless product-carrying belt having a belt width and forming a closed loop about the respective infeed and outfeed rollers, the product-carrying belt adapted to be driven for moving at a linear velocity around the infeed and outfeed rollers the product-carrying belt defining an instantaneous conveying region having a length spanning between the respective infeed and outfeed rollers, one of the infeed and outfeed rollers defining an instantaneous roller surface contacting region of the product carrying belt defining a pitch diameter of the product-carrying belt; and multiple lane separating bands spaced apart along the belt width and positioned around the infeed and outfeed rollers to form multiple lanes aligned with the length of the conveying region, the separating bands contacting the product-carrying belt to form a frictional interface that causes the separating bands to move in coordination with the product-carrying belt, the roller surface contacting region of the product-carrying belt defining a pitch diameter of the separating bands, the ratio of the pitch diameter of the separating bands to the pitch diameter of The product-carrying belt defining a pitch diameter ratio that results in movement of the separating bands, when driven by movement of the product-carrying belt, at a linear band velocity that is faster than the product-carrying belt.

13. The conveyor apparatus of claim 12, further comprising a guide mechanism having multiple guide features spaced apart at intervals along the belt width for determining the position of the separating bands along the belt width, the separating bands forming multiple lanes along the conveying region.

14. The conveyor apparatus of claim 13 in which the guide mechanism is conveniently replaceable for changing the spacing of the separating bands.

15. The conveyor apparatus of claim 13 in which the guide mechanism includes a guide roller having a width and multiple circumferential grooves spaced apart along the width of the guide roller, the grooves sized to receive the separating bands for accurately positioning the separating bands along the belt width.

16. The conveyor apparatus of claim 12, further comprising a drive mechanism operatively connected to one of the infeed roller, the ourfeed roller, and the product-carrying belt for driving the product-carrying belt around the infeed and outfeed rollers in response to an applied motive force, the driving of the product-carrying belt imparting a frictional force to the separating bands and thereby moving the separating bands in coordination with the product-carrying belt.

17. The conveyor apparatus of claim 12, further comprising an adjustable tensioning device for tensioning the separating bands across the conveying region.

18. The conveyor apparatus of claim 17 in which the tensioning device includes a tensioning roller positioned between the product-carrying belt and the separating bands.

19. The conveyor apparatus of claim 17 in which the product-carrying belt, the infeed roller, and the outfeed roller define an instantaneous return region of the product-carrying belt opposite the conveying region, and the tensioning device pulls the separating bands away from the return region to form a gap between the separating bands and the return region, and further comprising:

a cleaning device positioned in the gap for cleaning the product-carrying belt.

20. The conveyor apparatus of claim 12 in which:

the articles include acceptable articles and unacceptable articles; and the product-carrying belt and the separating bands are of a color that resembles the color of the acceptable articles for facilitating the sorting of the unacceptable articles by an automated inspection and sorting system.

* * * * *

UNITED STATES PATENT AND TRADEMARK OFFICE
CERTIFICATE OF CORRECTION

PATENT NO : 6,152,282

DATED : November 28, 2000

INVENTOR(S) : James Ewan et al.

It is certified that error appears in the above-identified patent and that said Letters Patent are hereby corrected as shown below:

Col. 10, line 25
replace "$W_o$ X $d_{p-o}$="
with --$W_o$ X $d_{b-o}$=--

Col. 11, line 62
replace "ourfeed"
with --outfeed--.

Col. 12, line 14
replace "bell"
with --belt--.

Col. 12, line 19
replace "produce-carrying"
with --product-carrying--.

Col. 13, line 60
replace "tee"
with --the--.

Col. 14, line 10
replace "producer-carrying"
with --product-carrying--.

Col. 14, line 13
replace "fee"
with --the--.

Col. 14, line 20
replace "ourfeed"
with --outfeed--.

UNITED STATES PATENT AND TRADEMARK OFFICE

CERTIFICATE OF CORRECTION

PATENT NO. : 6,152,282

DATED : November 28, 2000

INVENTOR(S) : James Ewan et al.

It is certified that error appears in the above-identified patent and that said Letters Patent is hereby corrected as shown below:

Col. 14, line 42
replace "The"
with --the--.

Col. 14, line 64
replace "ourfeed"
with --outfeed--.

Signed and Sealed this

Twenty-ninth Day of May, 2001

Attest:

Nicholas P. Godici

NICHOLAS P. GODICI

*Attesting Officer* *Acting Director of the United States Patent and Trademark Office*